O. DUCKER.
CARBURETER.
APPLICATION FILED SEPT. 28, 1909.
1,014,133.
Patented Jan. 9, 1912.
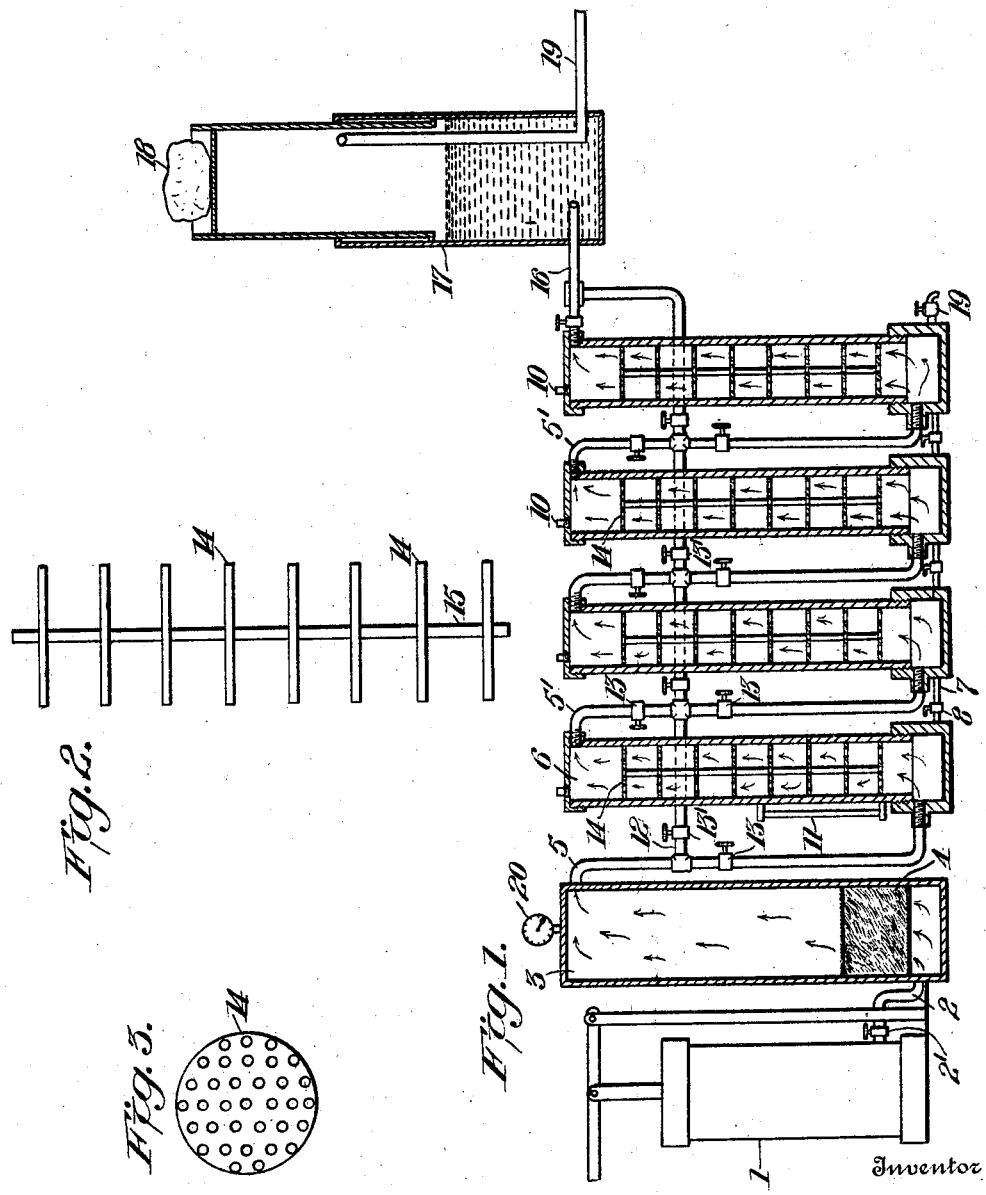

UNITED STATES PATENT OFFICE.

ORLANDO DUCKER, OF WASHINGTON, DISTRICT OF COLUMBIA, ASSIGNOR OF ONE-FOURTH TO FREDRICK E. LYKES, OF TAMPA, FLORIDA.

CARBURETER.

1,014,133. Specification of Letters Patent. Patented Jan. 9, 1912.

Application filed September 28, 1909. Serial No. 520,029.

*To all whom it may concern:*

Be it known that I, ORLANDO DUCKER, a citizen of the United States, residing at Washington, in the District of Columbia, have invented certain new and useful Improvements in Carbureters, of which the following is a specification.

My invention relates to carbureting air.

The object of my invention broadly is the production of a gas for illuminating and heating purposes, by passing atmospheric air through one or more hydrocarbon liquids so that the air is impregnated with carbon and becomes combustible.

More specifically my invention relates to the production and arrangement of an apparatus for the manufacture of such gas, which is cheaply constructed, readily assembled and disassembled for repairs and one which produces a rich and thoroughly mixed gas of a very stable nature.

My invention is especially adapted for individual houses and hotels, in cities as well as in rural districts. It is also very efficient on a more extended scale. It is durable and simple, needing little attention or repairs.

The invention will best be understood by the following description taken in connection with the accompanying drawings, in which:

Figure 1 is a side elevation of the apparatus, some of the parts being shown diagrammatically and others in sections; Fig. 2 shows arrangement of baffle plates, and Fig. 3, the perforations in same.

In Fig. 1, 1 represents a pump and is preferably operated by a weight, not shown, with the ordinary gearing, not shown, but it may be operated by hand. A pipe 2 provided with check valve 2' leads from the pump to the bottom of air tank 3. The air tank 3 may also be fitted with a perforated partition or basket 4, which in very damp climates may be filled with a suitable mixture for drying the air as it passes through it to the upper part of the tank. I find a mixture of charcoal, soda and carbonate of calcium very good for the purpose, say one part each of the soda and carbonate of calcium to four of charcoal. The air tank 3 is provided with a pressure gage 20, to indicate the pressure in said tank. Pipe 5 leads to a series of tanks 6, which are connected by pipes 5', from top to bottom and at their bottoms are connected by pipes 7 each of which is fitted with cut-off valves 8, and at least one tank has a drain valve 19 and all of them at top are fitted with filling caps 10 and one tank has a glass gage 11, preferably the first tank. The connecting pipes 5' are themselves connected with a shunt pipe 12 in the manner shown with a shut-off valve 13 below the shunt pipe. Pipe 5 has valve 13 below the shunt pipe and also above shunt pipe. Similar valves 13' are placed in the shunt pipe.

Each tank 6 is provided with a removable series of baffle plates 14 preferably carried by a central support 15 as more specifically shown in Fig. 2. As the baffle plates are secured to the support they may all be removed at one and the same time should it be found necessary to clean or repair one or more of them. The securing of the baffle plates to the support also obviates the necessity of providing the tank with baffle plate supporting means. The baffle plates 14 can be made of gauze or perforated as shown in Fig. 3. A pipe 16 leads from the last tank into the gas reservoir 17, which is made with a sliding section provided with weight 18 on top of section as shown and is fitted with a consumer's pipe 19 for use. The reservoir is preferably of limited capacity and the liquid used therein is one of the less inflammable hydrocarbons.

The operation is as follows: The pump started, air is forced through the pipe 2 and check valve 2' into the bottom of tank 3 up through the drying mixture in the partition or basket 4, into the upper portion of the air tank and out through pipe 5 to bottom of the first tank where it is finely separated as it is forced through the perforated plates 14 and becomes partially saturated with hydro-carbon vapor from the liquid hydro-carbons in the tanks, then in passing on through the other tanks until thoroughly saturated, after which it passes into the reservoir 17, which is just large enough to give a steady pressure on the "main" by means of the weight 18. By thus finely dividing the air and subjecting it to a slow and extended pressure through the hydro-carbons, a very rich gas is produced. The function of the pipe 7 is to equalize the liquid in the tanks since the liquid in the first tank is absorbed more rapidly than that in the other tanks. In filling or replenishing the tanks the normally closed valves 8 are opened and the hydrocarbon poured into any one of the tanks through taps 10, whereupon the liquid seeks a common level through the pipes. A gage is carried by one of the tanks, preferably the first, to indicate the height of the liquid hydrocarbon. Should it become necessary to remove one of the tanks, for repair or otherwise the valves 13 in the two adjoining connecting pipes are closed and the valve 13' in the shunt pipe 12 shunting the tank is opened, so that the gas flows through the shunt pipe, after which the tank may be removed.

With this apparatus a heating coil may be entirely done away with and a very rich and fixed gas obtained. The omission of the heating coil and its burner greatly increases the efficiency of a small plant where a few burners are used at a time.

Having thus described my improvement, I claim,

A carbureter comprising an air compressor, a gas reservoir, a plurality of tanks, a drier, a pipe establishing communication between the drier and the air compressor, vertical pipes establishing communication between the tanks, a vertical pipe establishing communication between the drier and one of the tanks, a horizontal pipe establishing communication between another of the tanks and the reservoir, a horizontal shunt pipe communicating with the vertical and horizontal pipes, valves mounted in the shunt pipe between the vertical pipes, another valve mounted in the shunt pipe between said horizontal pipe and the adjacent vertical pipe, valves mounted in said first named vertical pipes below and above the shunt pipe, a valve mounted in said second named vertical pipe below the shunt pipe, and a valve mounted in said horizontal pipe between the shunt pipe and the tank.

In testimony whereof I have affixed my signature in presence of two witnesses.

ORLANDO DUCKER.

Witnesses:
JOHN H. SIGGERS,
DAVID R. WAGNER.